Patented Nov. 7, 1922.

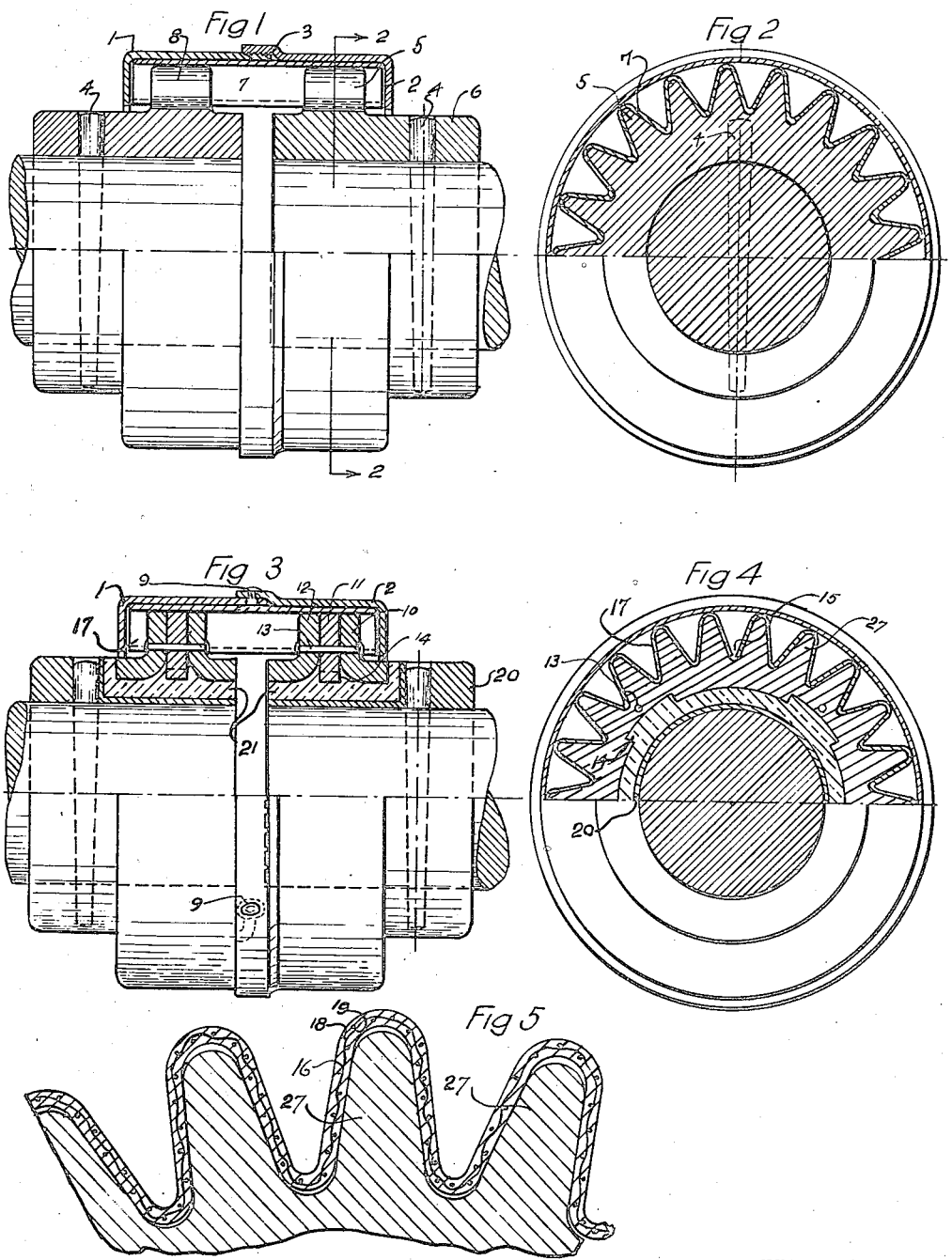

1,435,141

UNITED STATES PATENT OFFICE.

JOHN J. SERRELL, OF ELIZABETH, NEW JERSEY, ASSIGNOR TO SMITH AND SERRELL, OF MAHWAH, NEW JERSEY, A COPARTNERSHIP CONSISTING OF JOHN J. SERRELL AND ROBERT A. SMITH.

FLEXIBLE COUPLING DEVICE.

Application filed February 18, 1921. Serial No. 445,932.

*To all whom it may concern:*

Be it known that I, JOHN J. SERRELL, of Elizabeth, Union County, State of New Jersey, a citizen of the United States, have made a new and useful Invention Relating to Flexible Coupling Devices, of which the following is a specification, taken in connection with the accompanying drawing, which forms part of the same.

This invention relates especially to flexible couplings comprising corrugated coupling sleeves cooperating with aligned driving teeth or projecting members which may be permanently or detachably connected to the cooperating shafts or other rotary members. The corrugated sleeve preferably of thin resilient sheet metal or other suitable resilient or yielding material may fit somewhat loosely or yieldingly over the co-operating driving teeth which are preferably outwardly tapered and provided with round ends and which may advantageously be spaced apart at a considerable distance axially of the shafts so that the usual slight radial or angular misalignment of the shafts can be taken care of by the slight springy yield and movement of the resilient coupling sleeve enclosing the teeth, the sleeve being preferably held in position by a detachable or multiple piece cover which may have inwardly projecting flanges to hold the parts together. If desired the corrugated coupling sleeve or the driving teeth or both may be of suitable insulating material so that an insulating driving coupling of this type may be provided for use on small electric motors, etc.

In the accompanying drawing showing in a somewhat diagrammatic way a number of illustrative embodiments of this invention, Fig. 1 is a longitudinal partial section; and Fig. 2 is a corresponding partial transverse section taken substantially along the line 2—2 of Fig. 1.

Fig. 3 is a partial longitudinal section through another illustrative coupling; and Fig. 4 is a corresponding transverse partial section thereof, while Fig. 5 is an enlarged sectional view showing another type of coupling sleeve.

The cooperating driving teeth or aligned projecting driving members such as 5, 8 may be connected to the shafts in any suitable way as through the securing sleeve 6, which may be formed with these integral driving teeth 5 and pinned or otherwise secured to the shaft as by the tapered pin 4. The similar set of driving teeth 8 are preferably mounted some distance away from the cooperating teeth and are engaged by the corrugated coupling sleeve 7, which may be of any suitable material preferably of a somewhat resilient or yielding character and if desired fitting loosely enough over the driving teeth to allow at least some slight angular movement with respect thereto. Light sheet steel, bronze or brass may be used for this purpose and formed into shape in any desired way as by corrugating and then bending into circular form or if desired by drawing corrugated tubes of the desired cross-section which is a still stronger construction. In some cases where electric insulating properties are desirable suitable fibrous bakelite compositions may be used for this purpose, such as fabric carrying the desired considerable proportion of cured bakelite material so as to form a fairly rigid and strong corrugated sleeve when a thickness of one-sixteenth of an inch more or less is used. This coupling sleeve 7 may as indicated project outward somewhat beyond the driving teeth and may be held in this position in any suitable way as for instance, by being enclosed and also protected by a suitable cover such as 1, 2, having flanged in ends if desired and a screw joint 3 adjacent its center portion to facilitate assembly of the parts.

Under operating conditions the driving teeth, of which about twelve to twenty or so may be used around the circumference of each of the driving members, engage the corrugated sleeve sufficiently to transmit the power and yet each tooth has sufficient freedom of movement to take care of the slight angular tilting or other movements between the parts to the extent which is usually met with in practice where the shafts are fairly well aligned. The desirable resilience of the coupling sleeve combined with the slight looseness of fit which may also be provided in some cases, gives sufficient resilient or cushioning action to be helpful in some instances and of course the coupling is not only cheap and effective but may be readily inspected when the cover is removed.

Figs. 3 and 4 show another arrangement in which the driving teeth are formed separate from the securing sleeve and may if desired be formed or built up of stamped units or parts such as 10, 11 or 12, which may be connected by suitable rivets 13 or other means. These driving members may if desired be insulated from the securing sleeve 20 by molding the parts together with any suitable insulating molding material 25, such as bakelite molding compositions which may be cured or hardened under heat and pressure so as to securely unite these parts, preferably in connection with interlocking projections or notches such as 14 on at least some of the driving elements. If, as indicated, the securing sleeves are formed of heavier metal adjacent their ends they may be pinned or otherwise secured to the shafts so as to rigidly and strongly hold the driving teeth in position. The corrugated sleeve 17 may if desired be formed of corrugated sheet metal and for some purposes it is desirable to have the disconnected edges of this corrugated sheet of steel, brass or bronze brought into cooperation as at 15 without being inseparably connected so that these ends may be detached and the coupling sleeve removed radially without necessarily being slipped off the driving teeth by axial movement. Such sleeves for light motor drives may be formed of relatively thin springy material which is also advantageous in promoting the desired movements of the parts under service conditions. In this case the cover elements 1, 2 may be detachably connected adjacent the center portion as by a bayonet slot connection 9 of any desired form so that they may be readily disconnected and removed when desired.

If desired however, corrugated insulating coupling sleeves may also be used in this form of coupling and Fig. 5 shows a form of such an insulating sleeve in which several layers 18, 19 of bakelite impregnated fabric may be cured or molded together preferably in connection with an interposed layer 16 of a light resilient steel or other woven wire fabric which adds to the resilient strength of the corrugated sleeve without undesirable increasing of its weight. As indicated in Fig. 5 the driving teeth 27 may in some cases be advantageously shaped so as to engage the corrugated driving sleeve only in the intermediate portions of these teeth, the clearance at the top and bottom of the two surfaces facilitating the movements of the parts without causing excessive wear or breakage of the sleeve.

This invention has been described in connection with a number of illustrative embodiments, forms, proportions, parts, shapes, materials, arrangements, methods of manufacture and use, to the details of which disclosure the invention is not of course to be limited, since what is claimed as new and what is desired to be secured by Letters Patent is set forth in the appended claims.

I claim—

1. The coupling device comprising a pair of securing sleeves each having connected thereto a cooperating toothed driving member formed with driving teeth spaced apart axially in the two members, interposed molded bakelite insulating material between each of said securing sleeves and its driving member, a resilient corrugated coupling sleeve formed of bakelite impregnated insulating fabric having metallic woven wire reenforcement embedded therein loosely engaging the driving teeth to transmit power while allowing for misalignment movement and a detachable multiple piece cover having inwardly projecting edge flanges extending inward over the ends of said coupling sleeve to continually hold said coupling sleeve in engagement with said driving teeth.

2. The coupling device comprising a pair of securing sleeves each having connected thereto a cooperating toothed driving member formed with driving teeth spaced apart axially in the two members, interposed insulating material between at least one of said securing sleeves and its driving member and a corrugated coupling sleeve formed of insulating material engaging the driving teeth to transmit power while allowing for misalignment movement and a detachable multiple piece cover having inwardly projecting edge flanges extending inward over the ends of said coupling sleeve to continually hold said coupling sleeve in engagement with said driving teeth.

3. The coupling device comprising a pair of securing sleeves each having connected thereto a cooperating toothed driving member formed with driving teeth spaced apart axially in the two members, interposed insulating material between at least one of said securing sleeves and its driving member and a corrugated coupling sleeve engaging the driving teeth to transmit power while allowing for misalignment movement.

4. The insulating coupling device comprising a pair of cooperating toothed driving members each having correspondingly spaced driving teeth, a resilient corrugated coupling sleeve formed of insulating material loosely engaging the driving teeth to transmit power while allowing for misalignment movement and a cover extending around said driving sleeve.

5. The coupling device comprising a pair of cooperating toothed driving members each having twelve to twenty similarly spaced outwardly tapering rounded end driving teeth spaced apart axially in the two members, a resilient corrugated coupling sleeve formed of insulating material loosely engaging the driving teeth of both said driving members to transmit power while allowing for misalignment movement and a detachable multiple piece cover having inwardly projecting edge flanges extending inward over the ends of said driving sleeve and provided with detachable connecting means to secure said cover in position around said sleeve and the driving teeth of both said members.

6. The coupling device comprising a pair of cooperating toothed driving members each having similarly spaced rounded end driving teeth spaced apart axially in the two members and a resilient corrugated coupling sleeve engaging the driving teeth of both said driving members to transmit power while allowing for misalignment movement and a cover having inwardly projecting edge flanges extending inward over the ends of said driving sleeve to secure said cover in position around said sleeve and the driving teeth of both said members.

7. The coupling device comprising a pair of cooperating toothed driving members each having similarly spaced rounded end driving teeth spaced apart axially in the two members and a resilient corrugated coupling sleeve engaging the driving teeth of both said driving members to transmit power while allowing for misalignment movement.

8. The coupling device comprising a pair of cooperating toothed driving members each having twelve to twenty correspondingly spaced driving teeth spaced apart axially in the two members, a resilient corrugated coupling sleeve loosely engaging the driving teeth to transmit power while allowing for misalignment movement and a substantially cylindrical detachable multiple piece protecting cover having inwardly projecting portions to secure said cover in position around said sleeve and cooperating sets of driving teeth.

9. The coupling device comprising a pair of cooperating toothed driving members each having driving teeth spaced apart axially in the two members, a corrugated coupling sleeve engaging the driving teeth to transmit power while allowing for misalignment movement and a substantially cylindrical protecting cover having inwardly projecting portions to secure said cover in position around said sleeve and cooperating sets of driving teeth.

10. The coupling device comprising a pair of cooperating toothed driving members each having driving teeth spaced apart axially in the two members, a corrugated coupling sleeve engaging the driving teeth to transmit power while allowing for misalignment movement and a substantially cylindrical protecting cover and means to secure said cover in position around said sleeve and cooperating sets of driving teeth.

11. The coupling device comprising a driving member formed with about twenty rounded end driving teeth and a resiliently yielding externally unconstrained corrugated sheet of substantially uniform thickness forming a coupling sleeve loosely engaging the driving teeth to transmit power while allowing for misalignment movement.

12. The coupling device comprising a driving member formed with driving teeth and a corrugated resiliently yielding externally unconstrained sheet of substantially uniform thickness forming a coupling sleeve engaging the driving teeth to transmit power while allowing for misalignment movement.

13. The coupling device comprising a pair of cooperating axially separated toothed driving members and a corrugated coupling sleeve formed of a corrugated sheet of resilient material having disengageable inturned edges and loosely engaging the driving teeth to transmit power while allowing for misalignment movement and a detachable cover having inwardly projecting edge portions extending inward over the ends of said driving sleeve.

14. The coupling device comprising a pair of cooperating axially separated toothed driving members and a corrugated coupling sleeve formed of a corrugated sheet of material having disengageable edges and loosely engaging the driving teeth to transmit power while allowing for misalignment movement.

15. The coupling device comprising a pair of cooperating toothed driving members each having similarly spaced driving teeth spaced apart axially in the two members and a resilient corrugated coupling sleeve engaging the driving teeth of both said driving members to transmit power while allowing for misalignment movement.

16. The insulating coupling device comprising a pair of cooperating toothed driving members each having correspondingly spaced driving teeth formed of multiple thickness disks mounted in molded insulating material and a resilient corrugated coupling sleeve engaging the driving teeth to transmit power while allowing for misalignment movement.

JOHN J. SERRELL.